(12) United States Patent
Herynek

(10) Patent No.: US 6,625,974 B1
(45) Date of Patent: Sep. 30, 2003

(54) METHOD FOR OPERATING AN INTERNAL COMBUSTION ENGINE

(75) Inventor: Roland Herynek, Oetisheim (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 09/869,568

(22) PCT Filed: Oct. 17, 2000

(86) PCT No.: PCT/DE00/03636
§ 371 (c)(1),
(2), (4) Date: Jun. 29, 2001

(87) PCT Pub. No.: WO01/33059
PCT Pub. Date: May 10, 2001

(30) Foreign Application Priority Data

Oct. 30, 1999 (DE) .......................... 199 52 526

(51) Int. Cl.⁷ ................................. F01N 3/00
(52) U.S. Cl. ............................. 60/278; 60/289; 60/285; 60/293; 123/568.11; 123/568.31
(58) Field of Search .......................... 60/274, 278, 285, 60/286, 289, 293; 123/568.11, 568.31, 568.19, 568.16, 568.21

(56) References Cited

U.S. PATENT DOCUMENTS

| | | | |
|---|---|---|---|
| 5,448,887 A | 9/1995 | Takeshima | |
| 5,564,283 A | 10/1996 | Yano et al. | |
| 5,884,476 A | 3/1999 | Hirota et al. | |
| 5,975,046 A | * 11/1999 | Kaneko et al. | 123/300 |
| 6,021,765 A | * 2/2000 | DeGroot et al. | 123/568.21 |
| 6,044,642 A | * 4/2000 | Nishimura et al. | 60/285 |
| 6,085,718 A | 7/2000 | Nishimura et al. | |
| 6,089,017 A | 7/2000 | Ogawa et al. | |
| 6,112,729 A | * 9/2000 | Barnes et al. | 123/568.21 |
| 6,240,721 B1 | * 6/2001 | Ito et al. | 60/274 |
| 6,269,634 B1 | * 8/2001 | Yokota et al. | 60/286 |
| 6,311,679 B1 | * 11/2001 | Druzhinina et al. | 123/568.21 |
| 6,449,946 B2 | * 9/2002 | Kuji et al. | 60/286 |

FOREIGN PATENT DOCUMENTS

| | | |
|---|---|---|
| DE | 694 00 941 | 4/1997 |
| DE | 196 43 053 | 7/1997 |
| DE | 197 39 751 | 3/1998 |
| DE | 198 58 990 | 6/2000 |
| EP | 0 901 809 | 3/1999 |
| EP | 0 919 713 | 6/1999 |
| WO | WO 01/33059 | 5/2001 |

\* cited by examiner

*Primary Examiner*—Thomas Denion
*Assistant Examiner*—Binh Tran
(74) *Attorney, Agent, or Firm*—Walter Ottesen

(57) ABSTRACT

An internal combustion engine (1), especially of a motor vehicle, is described which is provided with a combustion chamber (4) into which fuel can be injected in a first operating mode during a compression phase and in a second operating mode during an induction phase. An exhaust-gas pipe (8) is provided in which a catalytic converter (12) is mounted. The engine (1) is provided with an exhaust-gas recirculation from the exhaust-gas pipe (8) to an intake manifold (7). A control apparatus (18) is provided for controlling (open loop and/or closed loop) operating variables of the engine (1). The exhaust-gas recirculation rate of the exhaust-gas recirculation is controllable (open loop and/or closed loop) by the control apparatus (18), inter alia, in dependence upon the temperature of the catalytic converter (12).

9 Claims, 1 Drawing Sheet

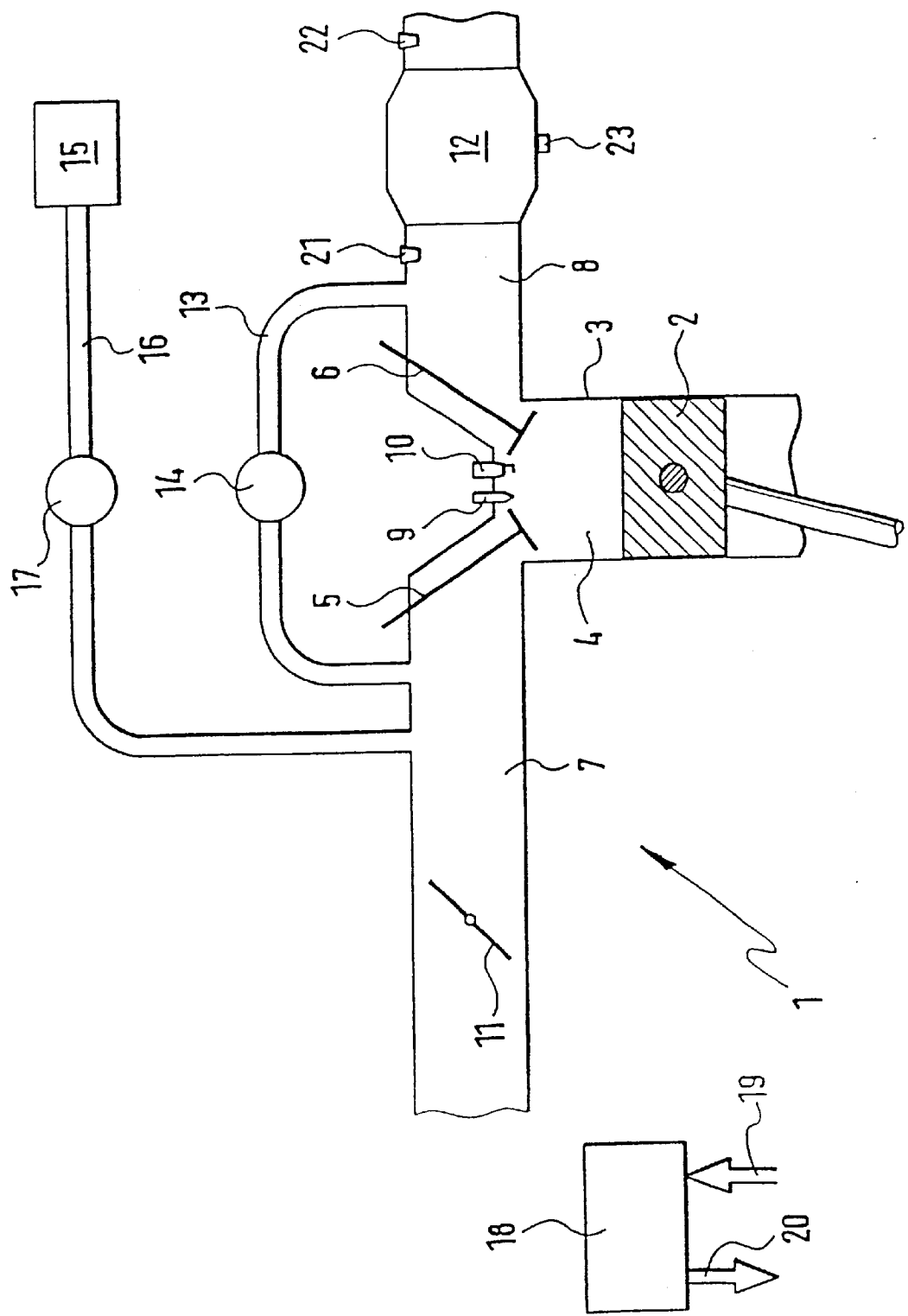

METHOD FOR OPERATING AN INTERNAL COMBUSTION ENGINE

FIELD OF THE INVENTION

The invention relates to a method for operating an internal combustion engine, especially of a motor vehicle, wherein fuel is injected into the combustion chamber in a first operating mode during a compression phase and in a second operating mode during an induction phase. In the method, the exhaust gas is supplied to a catalytic converter and exhaust gas is recirculated. The invention likewise relates to a corresponding internal combustion engine as well as a corresponding control apparatus for an engine of this kind.

BACKGROUND OF THE INVENTION

A method of this kind, an internal combustion engine of this kind and a control apparatus of this kind are all, for example, known from a so-called gasoline direct injection. There, fuel is injected into the combustion chamber of the engine in a homogeneous operation during the induction phase or in a stratified operation during the compression phase. The homogeneous operation is preferably provided for the full-load operation of the engine; whereas, the stratified operation is suitable for idle operation and part-load operation.

The internal combustion engine is operated with an excess of air especially in the stratified operation. This can lead to high temperatures of the exhaust gas. Likewise, in stratified operation, it is necessary that the exhaust gas is intermediately stored with the aid of an NOx storage catalytic converter in order to thereafter reduce the exhaust gas by a three-way catalytic converter. However, for the operation of the NOx storage catalytic converter, the temperature thereof may not exceed a specific limit temperature. The toxic substances contained in the exhaust gas increase when the limit temperature is exceeded.

SUMMARY OF THE INVENTION

It is an object of the invention to provide a method for operating an internal combustion engine with which the toxic substances in the exhaust gas are reliably held to a lowest possible level.

This task is solved with a method of the kind mentioned initially herein in accordance with the invention in that the exhaust-gas recirculation rate of the exhaust-gas recirculation is controlled (open loop and/or closed loop), inter alia, in dependence upon the temperature of the catalytic converter. The object is solved in accordance with the invention in an internal combustion engine and a control apparatus of the type mentioned initially herein.

The temperature of the catalytic converter can be reduced or increased by correspondingly influencing the exhaust-gas recirculation rate. This is utilized in the temperature-dependent influencing of the exhaust-gas recirculation rate in accordance with the invention in that the temperature of the catalytic converter is held below the limit temperature.

The mass flow through the engine and therefore the thermal flow in the exhaust-gas system can be reduced via the exhaust-gas recirculation. This defines a cooling of the exhaust-gas system. Low temperatures in the combustion chamber of the engine arise with the exhaust-gas recirculation essentially because of the later combustion based on a slower speed of the flame front in the combustion chamber.

According to the invention, especially more exhaust gas is recirculated with increasing temperature. This has the consequence that the air excess in the intake manifold is reduced in correspondence to the quantity of the recirculated exhaust gas. This, in turn, has the consequence that the temperature in the combustion chamber becomes less. From this, a lower temperature of the exhaust gas, and therefore of the catalytic converter, results. The temperature of the catalytic converter is thereby reduced because of the increased recirculation of exhaust gas because of the increasing temperature.

In total, it is ensured that the temperature of the catalytic converter remains below the limit temperature and therefore an optimal operation especially of the NOx storage catalytic converter is possible.

In especially advantageous embodiments of the invention, the temperature of the catalytic converter is measured and/or the temperature of the catalytic converter is derived from a temperature of the exhaust gas and/or the temperature of the catalytic converter is modeled.

In a further advantageous embodiment of the invention, the exhaust-gas recirculation is controlled (open loop and/or closed loop) in dependence upon a rough running. In this way, it is possible to consider the rough running as a limit for the control (open loop and/or closed loop) of the exhaust-gas recirculation rate.

Of special significance is the realization of the method of the invention in the form of a control element which is provided for a control apparatus of an engine, especially of a motor vehicle. A program is stored on the control element which is capable of being run on a computer, especially on a microprocessor, and is suitable for executing the method according to the invention. In this case, the invention is realized by a program stored on the control element so that this control element, which is provided with the program, defines the invention in the same way as the method which the program can carry out. Especially an electric storage medium can be used as a control element, for example, a read-only-memory or a flash memory.

Further features, application possibilities and advantages of the invention will become apparent from the following description of embodiments of the invention which are illustrated in the drawing. All described or illustrated features define the subject matter of the invention by themselves or in any desired combination independently of their summary in the patent claims or their dependency as well as independently of their formulation or presentation in the description and/or in the drawing.

BRIEF DESCRIPTION OF THE DRAWINGS

The single FIGURE of the drawing shows a schematic block circuit diagram of an embodiment of an internal combustion engine according to the invention.

DESCRIPTION OF THE PREFERRED EMBODIMENTS OF THE INVENTION

In the FIGURE, an internal combustion engine 1 of a motor vehicle is shown wherein a piston 2 is movable back and forth in a cylinder 3. The cylinder 3 is provided with a combustion chamber 4 which is, inter alia, delimited by the piston 2, an inlet valve 5 and an outlet valve 6. An intake manifold 7 is coupled to the inlet valve 5 and an exhaust-gas pipe 8 is coupled to the outlet valve 6.

An injection valve 9 and a spark plug 10 project into the combustion chamber 4 in the region of the inlet valve 5 and of the outlet valve 6. Fuel can be injected into the combustion chamber 4 via the injection valve 9. The fuel in the combustion chamber 4 can be ignited with the spark plug 10.

A rotatable throttle flap 11 is mounted in the intake manifold 7 and air can be supplied via the throttle flap to the intake manifold 7. The quantity of the supplied air is dependent upon the angular position of the throttle flap 11. A catalytic converter 12 is accommodated in the exhaust-gas pipe 8 and this catalytic converter serves to purify the exhaust gases arising because of the combustion of the fuel. The catalytic converter 12 is provided with a three-way catalytic converter and an NOx storage catalytic converter. Nitrogen oxides are temporarily intermediately stored with the NOx storage catalytic converter in order to then be reduced by the three-way catalytic converter.

An exhaust-gas recirculation pipe 13 leads from the exhaust-gas pipe 8 back to the intake manifold 7. An exhaust-gas recirculation valve 14 is accommodated in the exhaust-gas recirculation pipe 13. With this valve 14, the quantity of the exhaust gas, which is recirculated into the intake manifold 7, can be adjusted. The exhaust-gas recirculation pipe 13 and the exhaust-gas recirculation valve 14 define a so-called exhaust-gas recirculation.

A tank-venting line 16 leads from a fuel tank 15 to the intake manifold 7. A tank-venting valve 17 is mounted in the tank-venting line 16 and, with this valve 17, the quantity of the fuel vapor from the fuel tank 15, which is supplied to the intake manifold 7, can be adjusted. The tank-venting line 16 and the tank-venting valve 17 define a so-called tank venting.

A lambda sensor (21, 22) is provided in the region of the exhaust-gas pipe 7 ahead of the catalytic converter 12 and/or after the catalytic converter 12. Only one of the two lambda sensors (21, 22) can be present or both can be present. A lambda control loop is realized in the control apparatus 18 with the aid of the lambda sensor(s) (21, 22) with which lambda is controlled, for example, to one.

The piston 2 is displaced by the combustion of the fuel in the combustion chamber 4 into a back and forth movement which is transmitted to a crankshaft (not shown) and applies a torque thereto.

Input signals 19 are applied to a control apparatus 18 and these signals define measured operating variables of the engine 1. For example, the control apparatus 18 is connected to an air-mass sensor, a lambda sensor, an rpm sensor and the like. Furthermore, the control apparatus 18 is connected to an accelerator pedal sensor which generates a signal which indicates the position of an accelerator pedal, which can be actuated by the driver, and therefore indicates the requested torque. The control apparatus 18 generates output signals 20 with which the performance of the engine 1 can be influenced via actuators or positioning devices. For example, the control apparatus 18 is connected to the injection valve 9, the spark plug 10 and the throttle flap 11 and the like and generates the signals required to drive the same.

The control apparatus 18 is, inter alia, provided to control (open loop and/or closed loop) the operating variables of the engine 1. For example, the fuel mass, which is injected by the injection valve 9 into the combustion chamber 4, is controlled (open loop and/or closed loop) by the control apparatus 18 especially with respect to a low fuel consumption and/or a low development of toxic substances. For this purpose, the control apparatus 18 is provided with a microprocessor on which a program is stored in a memory medium, especially in a flash memory, and this program is suited to execute the above-mentioned control (open loop and/or closed loop).

The engine 1 can be operated in a plurality of operating modes. Accordingly, it is possible to operate the engine 1 in a homogeneous mode of operation and in a stratified mode of operation.

In the homogeneous operation, the fuel is injected by the injection valve 9 directly into the combustion chamber 4 of the engine 1 during the induction phase. The fuel is thereby substantially swirled up to ignition so that an essentially homogeneous air/fuel mixture arises in the combustion chamber 4. The torque to be generated is adjusted by the control apparatus 18 essentially via the position of the throttle flap 11. In homogeneous operation, the operating variables of the engine 1 are so controlled (open loop and/or closed loop) that lambda is equal to one. The homogeneous operation is especially used at full load.

In stratified operation, the fuel is injected by the injection valve 9 directly into the combustion chamber 4 of the engine 1 during the compression phase. In this way, no homogeneous mixture is present in the combustion chamber 4 with the ignition by the spark plug 10; instead, a fuel stratification is present. The throttle flap 11 can be completely opened except for requests, for example, of the exhaust-gas recirculation and/or of the tank venting and the engine 1 can thereby be operated dethrottled. The torque to be generated is, in stratified operation, substantially adjusted via the fuel mass. With the stratified operation, the engine 1 can be operated especially at idle and at part load.

There can be a back and forth switching or switchover between the above-mentioned operating modes of the engine 1. Such switchovers are executed by the control apparatus 18.

For the operation of the NOx storage catalytic converter, it is necessary that the temperature thereof remain below a limit temperature of approximately 500° C. If the temperature of the NOx storage catalytic converter rises above the limit temperature, then the possibility is present that the storage rate for the storage of the nitrogen oxides deteriorates. This leads to an increased emission of toxic substances.

A temperature sensor 23 is assigned to the catalytic converter 12 especially to the NOx storage catalytic converter. With the temperature sensor, the temperature of the catalytic converter 12, especially of the NOx storage catalytic converter, can be measured.

Alternatively or in addition, a temperature sensor can be assigned to the exhaust-gas pipe 8. What is essential is that a temperature belonging to the exhaust gas can be measured by the temperature sensor from which a conclusion can be drawn as to the temperature of the catalytic converter 12, especially of the NOx storage catalytic converter.

Likewise, it is possible that the above-mentioned temperature of the catalytic converter 12, especially of the NOx storage catalytic converter, is alternatively or in addition modeled from other operating variables of the engine 1.

The control apparatus 18 influences the exhaust-gas recirculation rate of the exhaust-gas recirculation via the exhaust-gas recirculation valve 14 in dependence upon the temperature measured by the temperature sensor 23.

The control apparatus 18 controls (open loop and/or closed loop) the exhaust-gas recirculation rate in such a manner that the temperature, which is measured by the temperature sensor 23, does not exceed the limit temperature. In a case of increasing temperature of the NOx storage catalytic converter, the exhaust-gas recirculation rate is increased by the control apparatus 18 so that therefore more exhaust gas is recirculated from the exhaust-gas pipe 8 into the intake manifold 7. On the other hand, in the case of a falling temperature, the exhaust-gas recirculation rate is again reduced.

In the case of an increasing temperature, the air excess in the intake manifold 7 is reduced by the increased recirculated exhaust gas. The air/fuel ratio lambda reduces correspondingly. The temperatures of the combustion and therefore in the combustion chamber 4 of the engine 1 are reduced because of the reduced air excess. This has as a consequence a reduction of the temperature of the exhaust gas and therefore also a reduction of the temperature of the NOx storage catalytic converter.

At the same time, however, the pressure in the intake manifold 7 does not change at full dethrottling. There, the reduced air excess is replaced by the recirculated exhaust gas so that the pressure in the intake manifold 7 remains approximately constant. This, in turn, has the consequence that the position of the throttle flap 11 in the intake manifold 7 need not be changed. With a throttling of the throttle flap 11, for example, because of a request of the tank venting, the throttle flap 11 must, however, be closed in order that the pressure in the intake manifold 7 remains constant.

The above-mentioned air excess is especially present in stratified operation. The air excess is, however, also present for a lean homogeneous operation. The described exhaust-gas recirculation, which is dependent upon the temperature of the catalytic converter 12, can thereby be applied in stratified operation and/or in homogeneous operation.

In lieu of the measurement of the temperature of the catalytic converter 12, it is possible to determine the storage rate of the NOx storage catalytic converter and to use the same as an index for the temperature of the catalytic converter 12. If the storage rate of the NOx storage catalytic converter 12 drops, then the exhaust-gas recirculation rate has to be increased in order to reduce the temperature of the catalytic converter 12 and in order to thereby again increase the storage rate.

As a further possibility, the rough running can be considered in the control (open loop and/or closed loop) of the exhaust-gas recirculation. This rough running defines a limit for the influencing of the exhaust-gas recirculation rate in dependence upon the temperature of the catalytic converter 12. With this consideration of the rough running, this limit can be correspondingly included in the control (open loop and/or closed loop) of the engine 1.

What is claimed is:

1. A method for operating an internal combustion engine including an engine for a motor vehicle, the engine having a combustion chamber and being equipped with a catalytic converter, the method comprising the steps of:

injecting fuel into said combustion chamber of the engine in a first operating mode during a compression phase and in a second operating mode during an induction phase;

supplying exhaust gas of said engine to said catalytic converter; and, recirculating said exhaust gas and controlling the rate of recirculation in dependence upon the temperature of said catalytic converter wherein the control of said rate of recirculation is an open loop control.

2. A method for operating an internal combustion engine including an engine for a motor vehicle, the engine having a combustion chamber and being equipped with a catalytic converter, the method comprising the steps of:

injecting fuel into said combustion chamber of the engine in a first operating mode during a compression phase and in a second operating mode during an induction phase;

supplying exhaust gas of said engine to said catalytic converter; and, recirculating said exhaust gas and controlling the rate of recirculation in dependence upon the temperature of said catalytic converter wherein the control of said rate of recirculation is a closed loop control.

3. A method for operating an internal combustion engine including an engine for a motor vehicle, the engine having a combustion chamber and being equipped with a catalytic converter, the method comprising the steps of:

injecting fuel into said combustion chamber of the engine in a first operating mode during a compression phase and in a second operating mode during an induction phase;

supplying exhaust gas of said engine to said catalytic converter;

recirculating said exhaust gas and controlling the rate of recirculation in dependence upon the temperature of said catalytic converter; and, deriving said temperature of said catalytic converter from a temperature of said exhaust gas.

4. A method for operating an internal combustion engine including an engine for a motor vehicle, the engine having a combustion chamber and being equipped with a catalytic converter, the method comprising the steps of:

injecting fuel into said combustion chamber of the engine in a first operating mode during a compression phase and in a second operating mode during an induction phase;

supplying exhaust gas of said engine to said catalytic converter;

recirculating said exhaust gas and controlling the rate of recirculation in dependence upon the temperature of said catalytic converter; and, modeling said temperature of said catalytic converter.

5. A method for operating an internal combustion engine including an engine for a motor vehicle, the engine having a combustion chamber and being equipped with a catalytic converter, the method comprising the steps of:

injecting fuel into said combustion chamber of the engine in a first operating mode during a compression phase and in a second operating mode during an induction phase;

supplying exhaust gas of said engine to said catalytic converter;

recirculating said exhaust gas and controlling the rate of recirculation in dependence upon the temperature of said catalytic converter; and, recirculating more gas with increasing temperature.

6. A method for operating an internal combustion engine including an engine for a motor vehicle, the engine having a combustion chamber and being equipped with a catalytic converter, the method comprising the steps of:

injecting fuel into said combustion chamber of the engine in a first operating mode during a compression phase and in a second operating mode during an induction phase;

supplying exhaust gas of said engine to said catalytic converter;

recirculating said exhaust gas and controlling the rate of recirculation in dependence upon the temperature of said catalytic converter; and, controlling the recirculation rate of said exhaust gas in dependence upon a rough running of said engine.

7. A control element, including a read-only-memory or flash memory, for a control apparatus of an internal combustion engine including an engine of a motor vehicle, the engine having a combustion chamber and being equipped with a catalytic converter, said control element comprising: a program stored on said control element which can be run on a computer including a microprocessor, and said program being configured to carry out the method steps of: injecting fuel into said combustion chamber of the engine in a first operating mode during a compression phase and in a second operating mode during an induction phase; supplying exhaust gas of said engine to said catalytic converter; recirculating said exhaust gas and controlling the rate of recirculation in dependence upon the temperature of said catalytic converter; and, deriving said temperature of said catalytic converter from a temperature of said exhaust gas.

8. An internal combustion engine including an engine of a motor vehicle, the engine comprising:

a combustion chamber wherein fuel is injectable in a first operating mode during a compression phase and in a second operating mode during an induction phase;

an intake manifold;

an exhaust-gas pipe wherein a catalytic converter is mounted;

an exhaust-gas recirculation system extending from the exhaust-gas pipe to said intake manifold;

a control apparatus for controlling operating variables of said engine;

said control apparatus functioning to control the exhaust-gas recirculation rate of said exhaust-gas recirculation in dependence upon the temperature of said catalytic converter; and, said control apparatus further deriving said temperature of said catalytic converter from a temperature of said exhaust gas.

9. A control apparatus for an internal combustion engine including an engine of a motor vehicle, the engine having a combustion chamber into which fuel can be injected in a first operating mode during a compression phase and in a second operating mode during an induction phase, the engine having an exhaust-gas pipe wherein a catalytic converter is mounted, the engine further including an exhaust-gas recirculation system extending from an exhaust-gas pipe to an intake manifold, said control apparatus comprising:

means for controlling operating variables of said engine;

means for controlling the exhaust-gas recirculation rate of said exhaust-gas recirculation system in dependence upon the temperature of said catalytic converter; and, means for driving said temperature of said catalytic converter from a temperature of said exhaust gas.

* * * * *